July 6, 1937.  T. H. SCHOEPF ET AL  2,085,873
MAGNETIC TRACK BRAKE SYSTEM
Original Filed Feb. 3, 1936   2 Sheets-Sheet 1
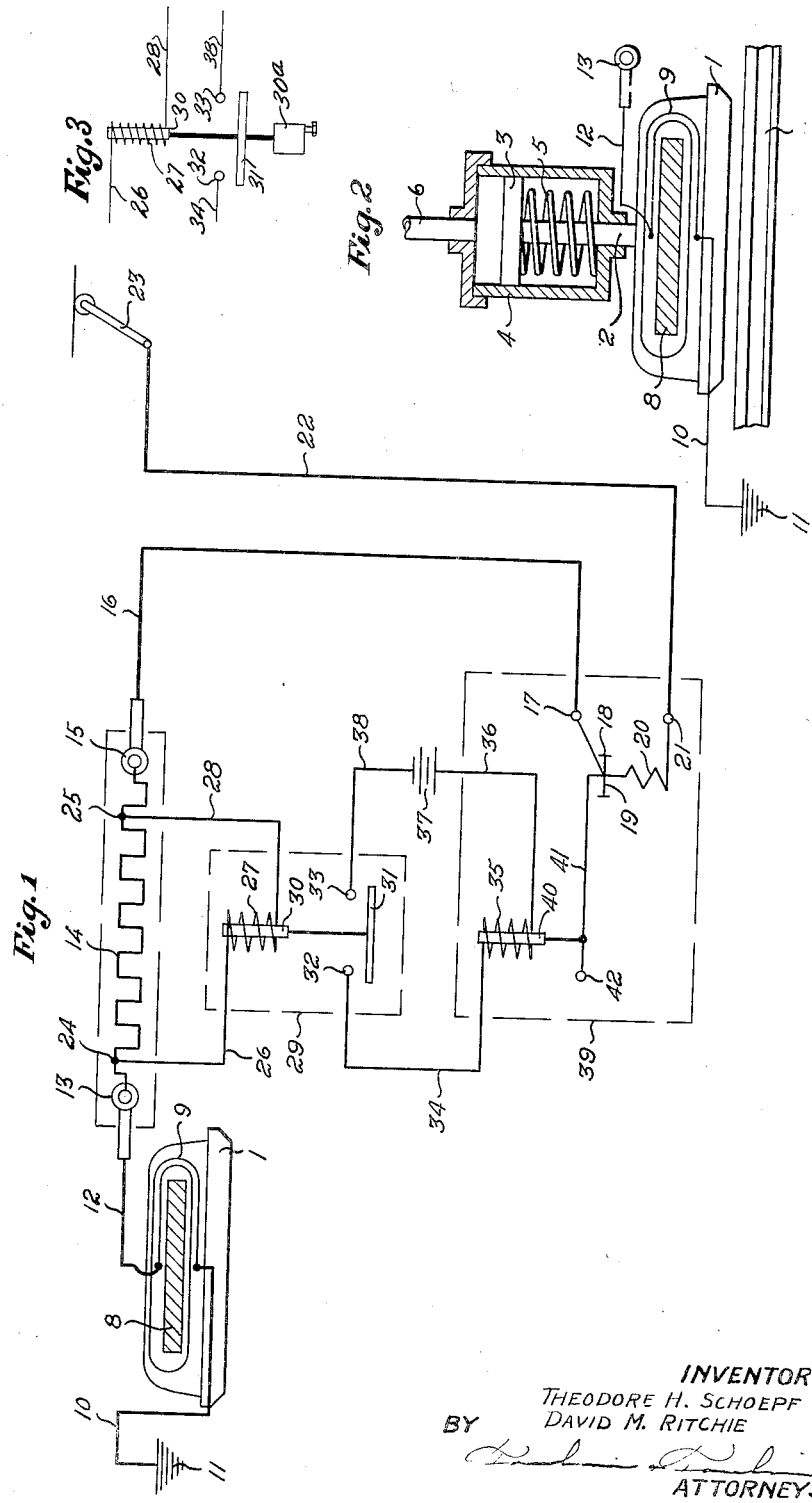
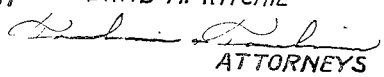
INVENTOR
THEODORE H. SCHOEPF
DAVID M. RITCHIE
BY
ATTORNEYS July 6, 1937.  T. H. SCHOEPF ET AL  2,085,873
MAGNETIC TRACK BRAKE SYSTEM
Original Filed Feb. 3, 1936   2 Sheets-Sheet 2
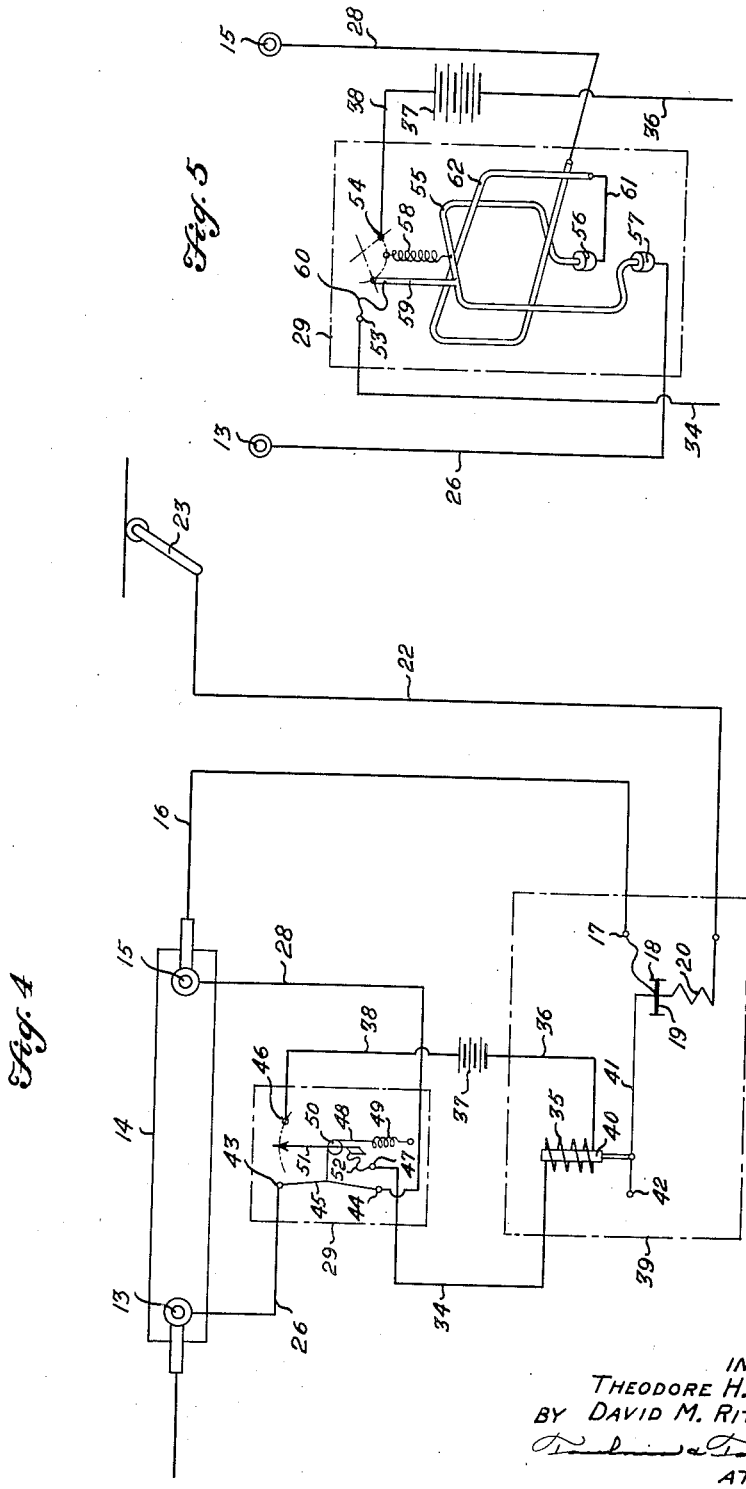
INVENTORS
THEODORE H. SCHOEPF
BY DAVID M. RITCHIE
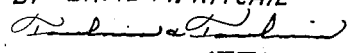
ATTORNEYS Patented July 6, 1937

2,085,873

UNITED STATES PATENT OFFICE 2,085,873

MAGNETIC TRACK BRAKE SYSTEM

Theodore H. Schoepf and David M. Ritchie, Cincinnati, Ohio, assignors to The Cincinnati Traction Building Company, Cincinnati, Ohio, a corporation of Ohio Original application February 3, 1936, Serial No. 62,126. Divided and this application October 29, 1936, Serial No. 108,242

9 Claims. (Cl. 188—165)

Our invention relates to magnetic brakes.

It is an object of this invention to provide means whereby to prevent damage and/or destruction of the coils of magnetic brakes, due to the generation of excessive heat therein.

It is an object of this invention to provide means whereby to prevent damage to the coils due to energization thereof, after the braking operation has been performed by the brakes.

It is a further object of this invention to provide means responsive to the heat of the brake shoe coils, whereby to interrupt the energizing circuit therefor when a predetermined temperature is reached.

It is a further object of this invention to provide such means which will be responsive both to the heat generated by the energization of the coils and also responsive to the heat generated therein by the friction between the brake shoe and the rail during the braking operation.

It is a further object of this invention to provide such means whereby the energizing circuit interrupting means is actuated by the power in the brake energizing circuit.

It is a further object of this invention to provide means whereby to prevent energization of the brake shoe coils in a magnetic braking system after the braking operation has been completed, and the vehicle to which the brakes are attached has come to rest whereby to provide utmost power economy and long life of the brake shoe.

This application is a division of our application Serial No. 62,126, filed February 3, 1936.

These and other objects and advantages will appear from the following description taken in connection with the drawings, in which is described and shown an illustrative embodiment of this invention.

In the drawings:

Figure 1 is a diagrammatic view of typical structure which may be used in the practice of our invention;

Figure 2 is a side elevation, partly in section, showing a magnetic brake shoe and a form of supporting and actuating means therefor;

Figure 3 is a fragmentary diagrammatic view showing the solenoid armature of the relay shown in Figure 1, equipped with dashpot control means;

Figure 4 is a view similar to Figure 1, but illustrating the substitution of a relay constructed on the hot wire principle for the relay illustrated in Figure 1; and Figure 5 is a fragmentary diagrammatic view illustrating the substitution, for the relays of Figures 1 and 3, of a relay constructed on the principle of an electrodynamometer.

Referring to the drawings in detail, as shown in Figure 2, the brake shoe which is generally designated 1 is preferably supported and actuated by the rod 2 having thereon a piston 3 which is supported for reciprocation in the cylinder 4 and normally urged upwardly therein by the spring 5 and adapted to be operated by the force of air introduced through inlet 6 into the cylinder 4 to oppose and overbalance the force of the spring 5.

By this means, the brake shoe may be urged downwardly against the rail 7 to perform the braking function. In the form of brake apparatus, in which it is preferred to apply the principles of our invention, the brake shoe 1 is placed closely adjacent the rail by the admission of air, as above described, to the cylinder 4. The coils of the brake shoe are then energized. When the energizing circuit is interrupted, the coil will be de-energized and the shoe 1 will be separated from the rail 7.

The brake shoe 1 is provided with a core 8 and an energizing coil 9, one pole of which coil is connected by means of the line 10 to the ground 11, while the other pole of the coil 9 is connected by means of the line 12 to the terminal 13 of a shunt, generally designated 14. The shunt 14 has the opposite terminal 15 thereof connected by means of the line 16 to the contact 17. The contact 17 is connected to a butt contact 18 which is adapted to cooperate with a second butt contact 19 which is connected to a blow-out coil 20. The blow-out 20 is connected to the contact 21. The contact 21 is connected by means of the line 22 to the trolley 23. The shunt 14 is provided with intermediate terminals 24 and 25 respectively. The intermediate terminal 24 is connected by means of wire 26 to one terminal of the solenoid coil 27. The opposite terminal of the solenoid coil 27 is connected by means of wire 28 to the intermediate terminal 25 of the shunt 14.

The solenoid coil 27 is a part of the relay, generally designated 29. The solenoid coil 27 cooperates with the solenoid armature 30 which is provided at its lower end with a switch blade or disk 31. The relay 29 also includes a pair of terminals 32 and 33 respectively. When the solenoid coil 27 of the relay 29 is energized, the switch blade or disk 31 is adapted to complete a circuit between the terminals 32 and 33. Terminal 32 is connected by means of wire 34 with one terminal of the solenoid coil 35.

The opposite terminal of the solenoid coil 35 is connected by means of wire 36 to one terminal of the power source 37 which has its opposite terminal connected by means of wire 38 to the terminal 33 of the relay 29. The power source 37 may comprise a storage battery or any other desired source of electrical power. The solenoid coil 35 comprises a part of the power switch device, generally designated 39. The solenoid coil 35 has associated therewith a solenoid armature 40, to the lower end of which is pivotally connected a switch arm 41. The switch arm 41 is pivotally supported at 42 and has the above-described butt contact 18 attached to the end thereof.

When the power switch device 39 is energized by energization of the solenoid coil 35, which occurs when the circuit between terminals 32 and 33 of the relay 29 is closed by the switch plate or disk 31, the armature 40 of the power switch device is drawn upwardly whereby to swing the switch arm 41 upwardly in counter-clockwise direction and separate the butt contacts 18 and 19.

It will thus be seen that the structure of this invention comprises broadly a shunt 14 connected in the brake shoe magnet energizing circuit, which shunt, in combination with the relay 29 and power switch device 39, would interrupt the current flow in the energizing circuit extending from the trolley 23 to the coil 9 of the brake shoe 1, the coil 9 being connected by means of the line 10 to the ground 11.

*Operation*

In the normal operating position of the parts, which is shown in Figure 1, the solenoid coils 27 and 35 are de-energized and the circuit between terminals 32 and 33 is opened. The butt contacts 18 and 19 are engaged one with the other. The path of the circuit is then from the trolley 23 through line 22 to contact 21 and thence through blow-out coil 20 to butt contact 19 which is engaged with butt contact 18. The path continues from butt contact 18 to contact 17 and thence through line 16 to terminal 15 of the shunt 14, thence through shunt 14 to terminal 13 of the shunt 14. From the terminal 13, the circuit continues through line 12 to one terminal of the brake shoe magnet coil 9, thence through the coil 9 to the opposite terminal and thence through line 10 to ground 11.

Under certain conditions which will be hereinafter pointed out, the solenoid 27 of the relay 29 is energized, whereby the armature 30 is drawn upwardly to place the switch blade or disk 31 in engagement with the terminals 32 and 33. This completes the circuit from terminal 33 through wire 38 to power source 37 and thence through wire 36 to and through solenoid coil 35, through wire 34 to terminal 32 and through switch blade or disk 31 to terminal 33. This energizes the solenoid coil 35 of the power switch device 39.

Upon energization of the solenoid 35 of the power switch device 39, the armature 40 is drawn upwardly whereby to swing the switch arm 41 upwardly in counterclockwise direction and remove the butt contact 18 from engagement with the butt contact 19 and thus open the above described circuit from the trolley 23 to the coil 9 of the brake shoe 1. The opening of the energizing circuit for the brake shoe magnet coil 9 prevents damage or destruction thereof due to overheating under operation after the vehicle, to which the brake shoes are attached, has been brought to a stop. The temperature of the magnet coils will, at that time, be considerable due to the power consumed therein in the energization of the magnets and also due to the heat of friction which is conducted to the coils.

The shunt 14 is preferably to be composed of a suitable material, so that the concrete ohmic resistance between the intermediate terminals 24 and 25 thereof may be predetermined from the formula:

$$R_t = R_1[1 + \alpha_1(t - t_1)]$$

$R_t$ is ohmic resistance at any temperature, $t$ degrees. $R_1$ is ohmic resistance at any temperature, $t_1$ degrees. $\alpha_1$ is temperature coefficient of resistance over the limited range encountered in the practice of the principles of this invention.

With the above rule, the relay 29 may be selected or designed to have suitable operative characteristics to effect the opening of the energizing circuit by separation of the butt contacts 18 and 19 through operation of the power switch device 39, as pointed out above. The relay 29 may have characteristics suitable to enable it to function and effect said separation of the butt contacts 18 and 19 after a predetermined lapse of time (Figure 3), instantaneously upon the flow of current of predetermined value in shunt 14, upon the temperature of the resistance between terminals 13 and 15 attaining a predetermined value (Figure 4), or under any other conditions which may be desired.

Adjustment of the various mechanisms and variation with any wide degree is contemplated and particularly changes in the nature of, and operative characteristics of, the solenoids, the structure described and illustrated being intended as illustrative and in no wise limiting.

The relay 29 may, for instance, be constructed on the principle of a known electro-dynamometer, wherein the turning effect exerted on the moving coil varies as the square of the current in the energizing circuit (see Figure 5); and, since the heat generated in the magnetic coil also varies as the square of the current, this device is particularly adaptable to the inventive concept herein described, and we also contemplate the use of relays constructed on the known hot wire principle (see Figure 4), which are particularly suited to and readily adapted for use in our invention.

As illustrated in Figure 3, the solenoid armature 30 may be equipped with manually adjustable dashpot means 30a, by means of which the engagement of the switch plate 31 with the contacts 32 and 33 will be delayed for a predetermined time, which time depends upon the manual adjustment of the dashpot means 30a.

As shown in Figure 4, the relay 29 is constructed on the hot wire principle, the wire 26 being connected to the terminal 43 and the wire 28 being connected to the terminal 44, between which contacts is interposed the wire 45. The wire 38 is connected to the contact 46, while the wire 34 is connected to the terminal 47. Attached to the intermediate portion of the wire 45 is a non-conducting cord member 48 which is also connected to the tension spring 49. The non-conducting cord member 48 extends over the pivotally mounted drum member 50 which has rigidly secured thereto the contact arm member 51. One end of the contact arm member 51 is adapted to swing in an arc to and from the contact 46, while the other end of the member 51 is connected by the wire 52 to the terminal 47. The wire 45, upon expanding, will permit the spring 49 to draw the non-conducting tension member 48 downwardly whereby to rotate the member 50 and swing the member 51 clockwise, as seen in Figure 4; and, when the wire 45 becomes sufficiently heated, the movement will be sufficiently great to engage the member 51 with the contact 46 and thus complete a circuit between terminal 47 and contact 46 to complete the energizing circuit for the solenoid 35 whereby to cause the butt contacts 18 and 19 to be separated. The expansion of the wire 45 under heat may be accomplished either through the heating effect of current passing therethrough, or by mechanical transference of heat from the coil of the shunt 14 to the wire 45 which is interposed between the wires 26 and 28 leading from the terminals 13 and 15 of the shunt 14.

The character of the wire 45 will determine which of the above theories of operation apply to the relay 29, as illustrated in Figure 4. The characteristics of the wire 45 may be so chosen that the above operation of the relay 29 to complete the energizing circuit for the solenoid 35 will occur after a predetermined time interval and the interval of time elapsing between initial flow of current through the wire 45 and operation of the relay 29 may be proportional to the value of current passing through the wire 45.

Figure 5 illustrates a preferred construction for the relay 29, in which the relay is constructed on the principle of a known electrodynamometer, wherein the turning effect exerted on the moving coil varies as the square of the current in the energizing circuit. As shown in Figure 5, the wire 34 is connected to the terminal 53, while the wire 38 is connected to the contact 54. The moving coil 55 is pivotally supported at one end by the mercury cup 56 and at the other end by the mercury cup 57 which is spaced from and aligned with the mercury cup 56. The central loop portion of the moving coil 55 is provided with a biasing spring 58 which constantly urges it in clockwise direction (as seen in Figure 5) about the axis which extends through the aligned mercury cups 56 and 57.

At one side of the biasing spring 58, the central loop portion of the moving coil 55 is provided with a contact arm 59 which is electrically connected by means of wire 60 with the terminal 53, which terminal is, as above described, connected to the wire 34. The terminal 13 of the shunt 14 is connected by means of wire 26 with the mercury cup 57, while the mercury cup 56 is electrically connected by the wire 61 to the stationary coil 62. The opposite end of the stationary coil 62 is connected by the wire 28 to the terminal 15 of the shunt 14.

Due to the electrical connection provided by wire 61 and mercury cup 56 between the ends of stationary coil 62 and moving coil 55, the same current travels through each. However, due to the disposition of the stationary coil 62 within the moving coil 55, and the angularity therebetween, the turning force existing therebetween depends upon the current value in the stationary coil 62 and also the current value in the moving coil 55. Therefore, the turning force exerted upon the moving coil 55 is proportional to the square of the current traveling through the relay. The biasing spring 58 normally causes the contact arm 59 to be disengaged from the contact 54, whereby the energizing circuit for the solenoid 35 is interrupted. Upon the flow of current of sufficient value through the relay, sufficient turning force will be generated to overcome the force of the biasing spring 58, whereby to cause the moving coil 55 to pivot in counterclockwise direction, as seen in Figure 5, and place the contact arm 59 in engagement with the contact 54, whereby to complete the energizing circuit for the solenoid 35.

It will be understood that the above described structure is illustrative and in no wise limiting, and that the structure which may be used in the practice of our invention is susceptible of variation within wide limits and that we desire to comprehend within our invention such modifications as may be necessary to adapt it to varying conditions and uses and which may be embraced within the claims and the scope of our invention.

Having thus fully described our invention, what we claim as new and desire to secure by Letters Patent is:

1. In a magnetic track brake system including a brake shoe having a core, a coil and an energizing circuit therefor; a shunt in said circuit, a relay adapted to be operated thereby, a power switch in said energizing circuit adapted to be opened by said relay, said shunt being adapted, upon the flow of current of predetermined value therethrough, to cause instantaneous operation of said power switch through energization of said relay, to open said energizing circuit, whereby to prevent overheating of said brake shoe.

2. In a magnetic track brake system including a brake shoe having a coil and an energizing circuit therefor, a shunt in said circuit, a relay adapted to be operated thereby, a power switch in said energizing circuit adapted to be opened by energization of said relay, said shunt being adapted upon the flow of current of a predetermined value therethrough to cause instantaneous operation of said power switch, through energization of said relay, to open the energizing circuit, whereby to prevent overheating of said brake coil.

3. In a magnetic track brake system including a brake shoe having a coil and an energizing circuit therefor, a shunt in said circuit, a relay adapted to be operated thereby, and a power switch operated by said relay, said relay being adapted, upon flow of current of predetermined value, to cause said power switch to open after a predetermined interval, whereby to arrest the energization of said brake shoe coil and prevent overheating thereof.

4. In a magnetic track brake system including a brake shoe having a coil and an energizing circuit therefor and means in said circuit adapted to limit the time of energization of the brake coil whereby to prevent overheating of said coil, said means comprising a shunt, a relay adapted to be energized by said shunt and upon energization, to operate, after a lapse of time, to cause a power switch to open, said power switch, upon energization, being adapted to interrupt said energizing circuit and prevent overheating of said brake shoe coil.

5. In a mechanism for arresting the energization of a magnetic track brake coil by interrupting the energizing circuit thereof, a shunt connected in said energizing circuit, a relay adapted to be energized by said shunt, and means adapted to be made operable upon energization of said relay to interrupt the energizing circuit of the track brake coil.

6. In a magnetic track brake system including a brake shoe having a coil and an energizing circuit therefor, a power switch adapted when energized to interrupt said energizing circuit, and means for energizing said power switch including a shunt adapted upon the flow therethrough of current of predetermined value to cause instantaneous energization of said power switch to open said brake shoe energizing circuit.

7. In a magnetic track brake system including a brake shoe having a coil and an energizing circuit therefor, a power switch adapted when energized to interrupt said energizing circuit, and means for energizing said power switch including a shunt adapted upon the flow therethrough of current of predetermined value to cause energization of said power switch to open said brake shoe energizing circuit after a predetermined interval.

8. In a magnetic track brake system including a brake shoe having a coil, an energizing circuit therefor, and means including a relay in said circuit adapted to limit the energization of said coil, said relay being constructed on the principle of an electrodynamometer wherein the turning effect on the moving coil varies as the square of the current.

9. In a magnetic track brake system including a brake shoe having a coil, an energizing circuit therefor, and means including a relay in said circuit adapted to limit the energization of said coil, said relay being constructed on the principle of an electro-dynamometer whereby the energizing circuit will be interrupted before the brake shoe coil becomes dangerously hot.

THEODORE H. SCHOEPF.
DAVID M. RITCHIE.

DISCLAIMER 2,085,873.—*Theodore H. Schoepf* and *David M. Ritchie*, Cincinnati, Ohio. MAGNETIC TRACK BRAKE SYSTEM. Patent dated July 6, 1937. Disclaimer filed October 21, 1939, by the assignee, *The Westinghouse Air Brake Company*.

Hereby enters this disclaimer to claims 3, 4, 5, and 7 of said patent.

[*Official Gazette November 14, 1939.*]